Jan. 15, 1963 P. E. MORTENSEN ETAL 3,073,947
WELDING STUD HOLDER AND LOADING APPARATUS
Filed June 12, 1961 3 Sheets-Sheet 1

INVENTORS.
PETER E. MORTENSEN
RAYMOND V. POMEROY
BY
BUCKHORN, CHEATHAM & BLORE
ATTORNEYS

Jan. 15, 1963 P. E. MORTENSEN ETAL 3,073,947
WELDING STUD HOLDER AND LOADING APPARATUS
Filed June 12, 1961 3 Sheets-Sheet 2

INVENTOR.
PETER E. MORTENSEN
RAYMOND V. POMEROY
BY
BUCKHORN, CHEATHAM & BLORE
ATTORNEYS

Jan. 15, 1963   P. E. MORTENSEN ETAL   3,073,947
WELDING STUD HOLDER AND LOADING APPARATUS
Filed June 12, 1961   3 Sheets-Sheet 3

INVENTORS.
PETER E. MORTENSEN
RAYMOND V. POMEROY
BY
BUCKHORN, CHEATHAM & BLORE
ATTORNEYS

3,073,947
WELDING STUD HOLDER AND LOADING APPARATUS

Peter E. Mortensen, Milwaukie, and Raymond V. Pomeroy, Portland, Oreg., assignors to Omark Industries, Inc., Portland, Oreg., a corporation of Oregon
Filed June 12, 1961, Ser. No. 116,357
10 Claims. (Cl. 219—98)

The present invention relates generally to stud fastener apparatus and more particularly relates to an electrical stud welding apparatus having a pivotal welding stud holder and an automatic loading device.

This invention is particularly useful to automatically load welding studs or pins into a welding stud holder after such holder has been used to electrically weld a previous stud to a workpiece. Previous front loading welding devices have been difficult to load with welding studs because the stud holder remains in a position adjacent the workpiece after welding so that there is little space within which to front-load such holder with welding studs. Also, the construction of back-loading stud holders, such as that shown in U.S. Patent No. 2,537,989, issued January 16, 1951, to Graham, is such that it is very difficult to accurately position and hold the welding stud in the stud holder. The results have been to make the welding operation time consuming and the welds produced thereby frequently defective.

The welding apparatus of the present invention overcomes the above-discussed disadvantages of previous welding apparatus by using a pivotal welding stud holder which can be easily front-loaded automatically. This welding stud holder is pivoted from a position adjacent to the workpiece to a position remote from the workpiece in order to make loading faster and easier. It utilizes a front-loading stud holder which allows accurate positioning of the stud within such holder and enables the fastening end of the stud to have a plurality of shapes. Also, the pivotal stud holder allows automatic feeding of the welding studs into said stud holder after each weld is made.

Broadly, the stud fastening apparatus of the present invention includes a pivotal stud holder adapted to support a stud fastener for attachment to a workpiece and to release said stud fastener after it is secured to such workpiece, and an actuator device for pivoting such holder between a first position adjacent the workpiece and a second position remote from such workpiece. The apparatus may also include a stud feeder device adapted to automatically insert the stud fastener into such stud holder when such holder is in its second position for attachment of such stud to the workpiece when in the second position.

Therefore, one of the objects of the present invention is to provide an improved stud fastening apparatus having a stud holder which rotates for easier loading of studs therein.

Another object of the invention is to provide an improved stud fastening apparatus in which a pivotal stud holder may be pivoted from a position adjacent a workpiece to a position remote from the workpiece for easier loading of studs therein.

A further object of the present invention is to provide an improved welding apparatus including a pivotal welding stud holder which is adapted for movement between a welding position substantially perpendicular to a workpiece and a loading position substantially parallel to such workpiece.

Still another object of the present invention is to provide an electrical stud welding apparatus in which a pivotal welding stud holder, an actuator device for automatically pivoting such holder between a position adjacent a workpiece and a position remote from the workpiece, and a stud feeder mechanism for automatically loading welding studs into such stud holder when such holder is in such remote position, cooperate to produce a faster and more effective stud welding operation.

A still further object of the invention is to provide a stud welding apparatus in which a welding stud holder is adapted to move from a starting position adjacent a workpiece in a straight line away from the workpiece to release a previously attached stud, and to pivot from a position adjacent the workpiece to a second position remote from the workpiece where a new stud is inserted into such holder, then to pivot back to such position adjacent the workpiece, and finally to move in a straight line toward the workpiece where such stud is electrically welded to such workpiece.

Additional objects and advantages of the present invention will become apparent upon referring to the following detailed description of a preferred embodiment thereof and to the attached drawings of which:

Figures 1, 2:
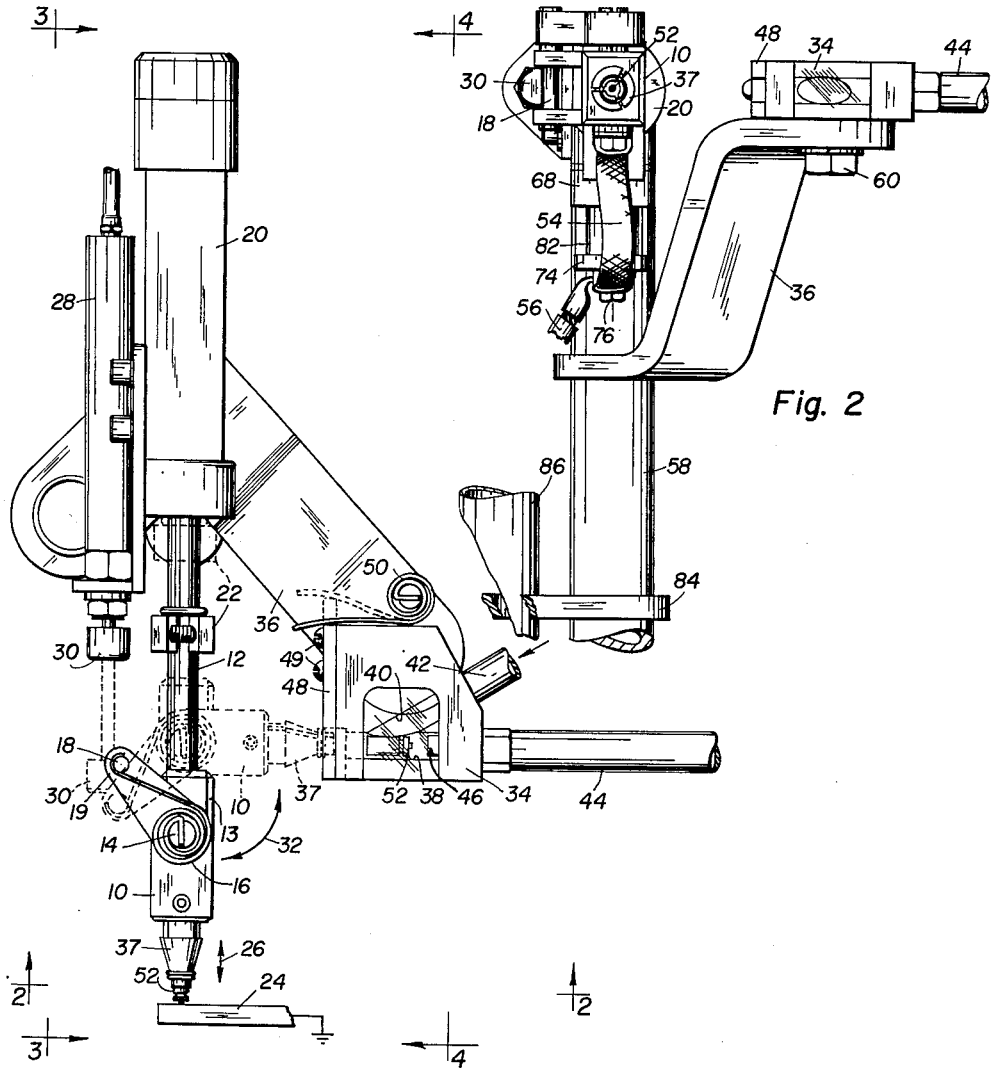
FIG. 1 shows a side view of a stud welding apparatus in accordance with the present invention, with an alternate position of certain parts shown by dotted lines.
FIG. 2 is a partial bottom view looking in the direction of the arrows 2—2 of FIG. 1.

While the present invention may be applied to other fastening apparatus, the preferred embodiment of the invention is shown in FIG. 1 to be a stud welding apparatus including a pivotal welding stud holder 10. This stud holder 10 is pivotally mounted on plunger shaft 12 by means of an adaptor 13 removably attached to such shaft by a setscrew (not shown) and a pivot pin 14 secured to such adaptor. A coiled spring 16, having one end attached to an actuating pin 18 secured to a support arm 19 extending from the holder 10 and the other end to a slot in the pivot pin 14, normally biases the stud holder 10 into the position shown by solid lines. The plunger shaft 12 is connected to a piston shown diagrammatically in FIG. 7 in a pneumatic or hydraulic cylinder 20 so that it is forced downward to the position shown by the solid lines by fluid pressure in the main cylinder 20 and is returned to the elevated position shown in dotted lines by a spring (not shown) within the cylinder 20. A stop 22 is mounted on the shaft 12 for vertical adjustment so as to determine the maximum displacement of the plunger 12. A guide 23 is screw-threaded into the lower end of the actuating cylinder 20 so as to extend parallel to the plunger shaft 12 and is slidably received in a hole in the stop 22 so as to prevent rotation of the plunger shaft 12 while enabling such plunger shaft to be reciprocated toward and away from a workpiece 24 as indicated by the arrow 26.

A second actuating cylinder 28 similar in construction to the main actuating cylinder 20 moves a plunger 30 from the position shown in solid lines into engagement with the actuating pin 18 which is attached to the support arm 19 so that it extends from the side of the stud holder 10. The plunger 30 continues moving, while continuing to engage the actuating pin 18, until it is in its position of maximum displacement as shown by the dotted lines so that the stud holder 10 is pivoted about the pivot pin 14 in a counterclockwise direction, as viewed in FIG. 1, to the position shown by dotted lines. When the cylinder 28 is deactivated, the plunger 30 moves back to its original position due to a spring return in such cylinder and the stud holder 10 also pivots back to its previous position due to the force of the biasing spring 16. Thus, the stud holder 10 is pivoted between a first position substantially perpendicular to a workpiece 24 and a second position substantially parallel to the workpiece 24 in the direction indicated by arrow 32.

An automatic stud feeder mechanism 34 may be mounted on a supporting plate 36 adjacent the stud holder 10 when such stud holder is in its second position shown by the dotted lines, so that a chuck portion 37 of such holder is in alignment with such stud feeder. This stud feeder 34 may take the form of a block of transparent plastic material having a pair of holes bored therein. A loading bore 38 may be provided completely through the feeder block 34 while a supply bore 40 may be formed partially through the feeder block 34 into the loading bore 38. A hollow supply tube 42 made of flexible material is attached at its outlet end to the inlet end of the supply bore 40 and is connected at its outlet end to a source of welding studs. These studs are placed endways in the supply tube 42 by a suitable orienting device (not shown) with their base end first and welding tip end last so that they will be properly positioned with their welding end remote from the chuck 37. The inlet end of the loading bore 38 in the feeder block 34 may be connected to a loading cylinder 44 similar in construction to the actuating cylinders 20 and 28 and having a piston plunger 46 which is positioned to move within the loading bore 38. A sliding door 48 is suitably mounted on the outlet end of the feeder block 34 by screw stops 49 and is biased by a coil spring 50 so that it closes the loading bore 38 when the stud holder chuck 37 is in its first position indicated by solid lines. The spring 50 may be mounted on the support plate 36 so that its free end engages the top of the sliding door 48 which has a U-shaped notch cut in the bottom edge thereof to accommodate the outer tip of the chuck 37.

When the stud holder 10 is pivoted to the position indicated by the dotted lines, the outer tip of the chuck 37 enters the U-shaped slot in the sliding door 48 so that it engages the upper edge of the slot and raises the door upward into the position indicated by the dotted lines until the opening of the chuck 37 is in alignment with the loading bore 38. At this time the loading cylinder 44 is actuated to move the plunger 46 forward into engagement with a welding stud 52 indicated by the dotted lines so that it pushes such stud endways out of the loading bore 38 into the chuck 37. It should be noted that the function of the sliding door 48 is to stop the welding stud 52 after it enters the loading bore 38 from the supply bore 40 in order to hold such stud in the receiving chamber formed by the junction of the supply bore 40 and the loading bore 38 and to prevent it from falling out of the feeder block 34 before the stud holder 10 is moved to its loading position.

As shown in FIG. 2, a flexible connector 54 connects the stud holder 10 to a suitable source of electrical power (not shown) through a connector cable 56 attached thereto. This source of electrical power supplies the electrical welding current which flows through the conductors 56 and 54 to the stud holder 10 and then through the welding stud 52 to the workpiece 24, which is usually electrically grounded. The particular stud 52 shown has a tip of reduced diameter on its exposed end and the flow of electrical current between the welding stud 52 and the grounded workpiece 24 causes melting and vaporization of the tip of the stud 52 so as to strike an arc, which arc melts the surface of the workpiece 24 immediately adjacent said tip as well as the end of the body of the stud, after which the melted portions of the stud and the workpiece are forced together and allowed to cool. It should be noted that the welding apparatus of the present invention can be used to perform any of several electrical stud welding methods, including methods known as the "initial gap method" and the "initial contact method." Briefly, the initial gap method involves holding the welding stud in spaced relationship to the workpiece while the welding circuit is closed, and then moving the tip end of such stud into contact with the workpiece to cause melting and vaporization of the tip of the stud to strike the arc referred to. The arc melts the end of the stud and a corresponding area of the workpiece during continued movement of the stud toward the workpiece. The initial contact method differs from the above in that the stud is first positioned in contact with the workpiece with the stud resiliently urged toward the workpiece before the welding circuit is closed.

Figure 3:
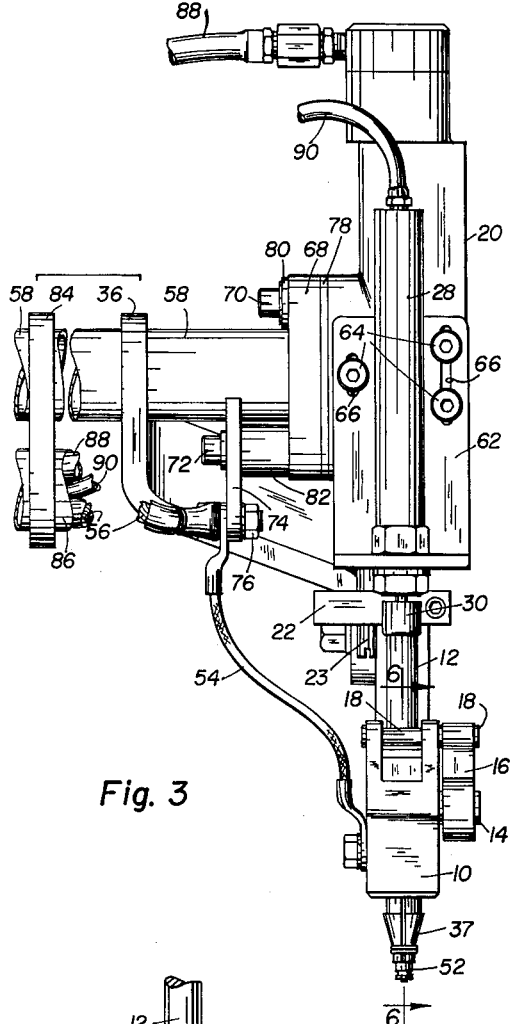
FIG. 3 is a left side view looking in the direction of the arrows 3—3 of FIG. 1.
Figure 4:
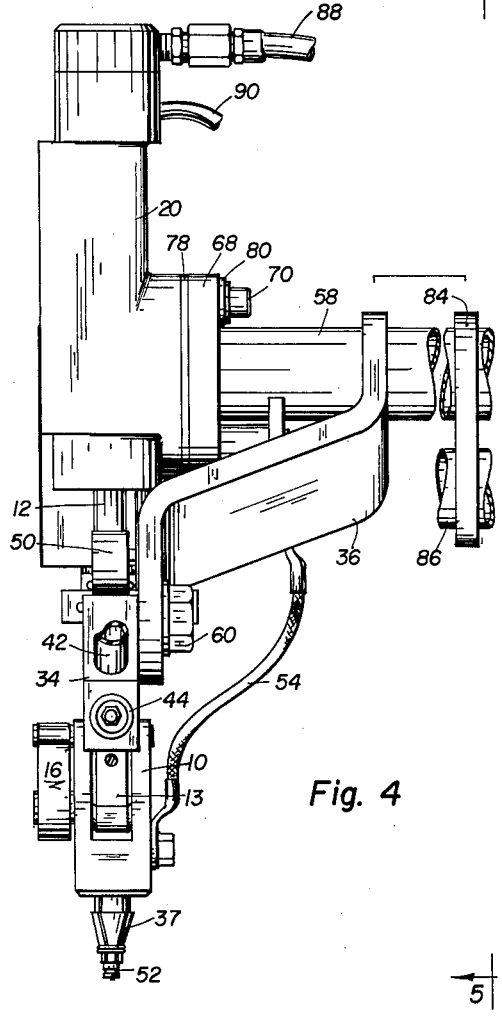
FIG. 4 is a right side view looking in the direction of the arrows 4—4 of FIG. 1.
Figure 5:
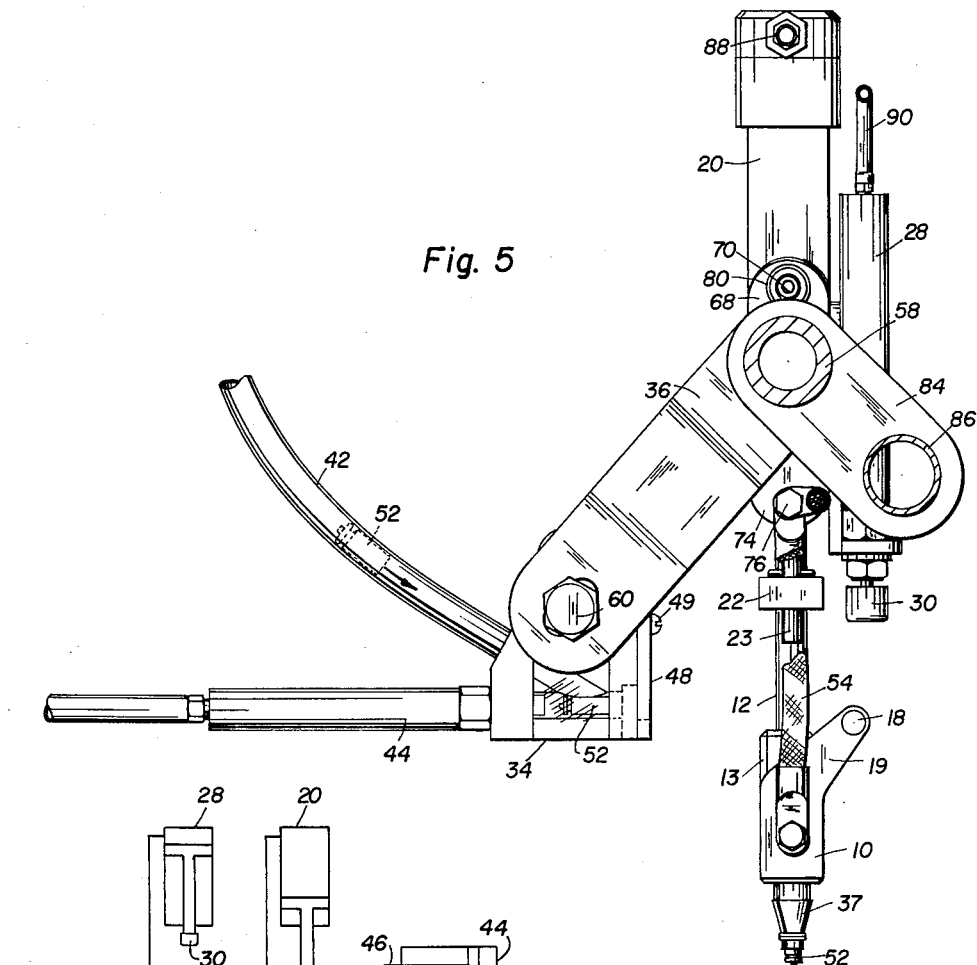
FIG. 5 is a rear elevation of the welding apparatus looking in the direction of the arrows 5—5 of FIG. 4.

The support structure of the welding apparatus is more clearly shown in FIGS. 3 to 5. This support structure includes a main support piece 58 which is attached to the support plate 36 for holding the feeder block 34 by means of a bolt 60 securing such feeder block to such plate. An adjustable mounting plate 62 supports the cylinder 28 on the main cylinder 20 by three bolts 64 which slide in slots 66 in the mounting plate 62 and the main cylinder 20 is attached to a flange 68 on the end of the support piece 58 by bolts 70 and 72 through such flange. A plate 74 of insulating material is attached to the bolt 72 and serves to support the electrical conductors 54 and 56 which are electrically connected by a bolt 76 extending through the plate 74. The cylinder 20 and parts connected thereto including the stud holder 10 are electrically insulated from the flange 68 of the support piece 58 by an insulator plate 78 between the flange 68 and the main cylinder 20, and insulator sleeves 80 and 82 around the bolts 70 and 72, respectively. Another support plate 84 is attached to the support piece 58 to hold a hollow cylindrical support member 86 within which are positioned the insulated electrical cable 56 and flexible tubes 88 and 90 used to supply fluid to the cylinders 20 and 28, respectively.

Figure 6:
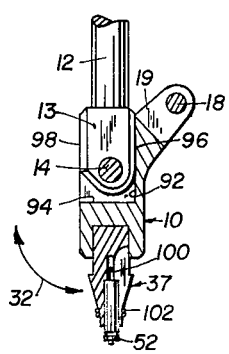
FIG. 6 is a fragmentary, vertical, sectional view through the welding stud holder taken along the lines 6—6 of FIG. 3.

FIG. 6 shows the pivotal stud holder 10 in detail. This stud holder may be formed with a pair of flat surfaces 92 and 94 substantially perpendicular to each other and which engage flat end portions 96 and 98, respectively, on plunger 12. These flat surfaces 92 and 94 serve as stops for the pivotal motion of the stud holder 10 about the pivot pin 14. Thus, the stud holder 10 can only pivot from the substantially vertical position shown, in a clockwise direction as viewed in FIG. 6 to a substantially horizontal position and then counterclockwise back to such original vertical position. The chuck 37 attached to the stud holder 10 has a cavity 100 therein shaped to receive the welding stud 52 with its rear end abutting against a stop near the bottom of the cavity. The tip of the chuck is slotted and a pair of O-rings 102 made of rubber or other resilient material are employed to resiliently force the slotted fingers forming the tip of chuck 37 into engagement with the stud 52.

Figure 7:
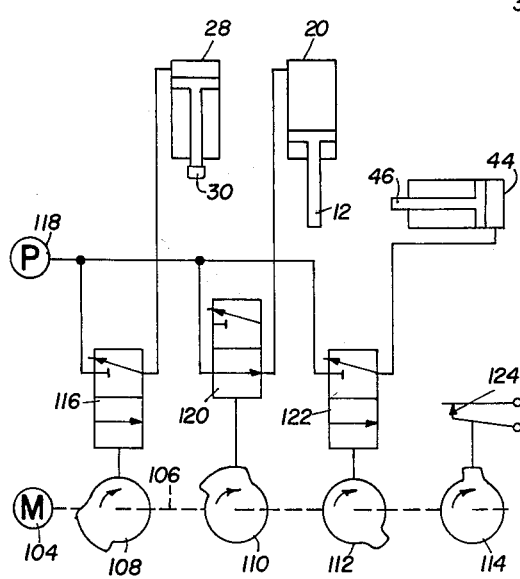
FIG. 7 illustrates schematically a cam apparatus for automatically controlling the operation of the stud welding apparatus shown in FIGS. 1 to 6.

One mechanism suitable for pneumatically actuating cylinders 20, 28 and 44 and for connecting the welding stud 52 to a source of electrical current automatically in proper time sequence is shown in FIG. 7. This mechanism may consist of an adjustable speed motor 104 having a rotating shaft 106 with a plurality of cams 108, 110, 112, and 114 adjustably secured to such shaft 106. The cam 108 is positioned so that its cam portion opens a valve 116 which connects the actuating cylinder 28 to a suitable compressed fluid source 118, and the cam 110 is positioned so that its cam surface opens a valve 120 which connects the main cylinder 20 to the fluid source 118. In a similar manner, the cam 112 opens a valve 122 to connect the loading cylinder 44 to the fluid source 118, and the cam 114 closes a switch 124 to complete the electrical welding circuit from a suitable A.C. or D.C. electrical current source 126 which may be a charged capacitor through the welding stud 52 and the workpiece 24.

The operation of the welding apparatus of the present invention is more easily described with reference to FIG. 7 which shows the position of the cams as a stud 52 is being welded to the workpiece 24. At this time the valve 116 is closed, valve 120 is open, valve 122 is closed and electrical switch 124 is closed. After this welding has been completed, the motor 104 rotates the shaft 106 until the cam 114 allows the switch 124 to open and disconnect the electrical source 126. Next, the cam 110 is rotated until it allows the valve 120 to close and disconnect the fluid source 118 which enables the spring return on the cylinder 20 to raise the stud holder 10 from the workpiece 24 to release the previously welded stud 52. Then the cam 108 opens the valve 116 to connect the fluid source 118 which activates the cylinder 28, drives the plunger 30 into contact with the actuating pin 18 and rotates the stud holder 10 from a position substantially perpendicular to the workpiece 24 to a position substantially parallel to such workpiece. After this, the cam portion of the cam 112 opens the valve 122 to connect the fluid source 118 which activates the cylinder 44, pushes the plunger 46 into contact with a new stud 52 and moves such stud into the chuck 37 of the stud holder 10 before such plunger is spring-returned to its original position. Then the cam portion of the cam 108 ceases to hold the valve 116 open so that such valve closes and allows the spring return of cylinder 28 to raise the plunger 30 which enables the spring 16 to pivot the stud holder 10 from the parallel position back to its original perpendicular position adjacent the workpiece 24. Then the cam portion of the cam 110 again opens the valve 120, activating the cylinder 20 which moves the plunger 12 down until the new welding stud 52 is in contact with the workpiece 24. Finally, the cam portion of the cam 114 then closes the switch 124 so that electrical current against flows through the stud 52 and the workpiece 24, it being understood that the capacitor forming the source 126 is charged between welding operations.

It will be obvious to one having ordinary skill in the art that many variations may be made in the above-detailed description of the present invention. For example, electrical solenoids may be used in place of the actuating cylinders 20, 28 and 44, or their movements may be done manually. The workpiece 24 may be moved in a straight line toward and away from the stud holder 10 to release the welded stud 52, instead of the straight line movement of such holder, and another timing mechanism may be used in the place of the motor-driven cams of FIG. 7. Therefore, it is not intended to limit the scope of the present invention to the above-detailed description of a preferred embodiment thereof, but that scope should be determined only by the following claims.

We claim:
1. A stud fastener apparatus comprising:
   a stud holder having a cavity therein adapted to support a stud fastener for attachment to a workpiece and to release said stud fastener after it is secured to said workpiece,
   means for rotating said stud holder from a first position adjacent said workpiece to a second position remote from said workpiece for loading and back to said first position for attachment, and
   means for loading said stud holder with said stud fastener by a powered loading device when said holder is in said second position by inserting only the base end of said fastener into said cavity so that the tip end of said fastener which is to be secured to said workpiece protrudes from said holder.

2. A stud fastener apparatus comprising:
   a stud holder having a chuck adapted to support a stud fastener by friction for attachment to a workpiece and to release said stud fastener after it is secured to said workpiece,
   means for rotating said stud holder from a first position adjacent said workpiece to a second position remote from said workpiece for loading and back to said first position for attachment, and
   means for loading said stud fastener into said holder endways through the front of said chuck by a powered loading device when said holder is in said second position so that the end of said fastener which is to be secured to said workpiece protrudes from the front of said chuck.

3. A stud welding apparatus comprising:
   a stud holder having a chuck with a cavity therein adapted to support a welding stud for attachment to a workpiece and to release said stud after it is secured to said workpiece,
   means for pivoting said stud holder from a first position substantially perpendicular to said workpiece to a second position substantially parallel to said workpiece for loading and back to said first position for welding, and
   means for loading said stud endways into said cavity through the front of said chuck when said holder is in said second position by a powered loading device so that the end of said stud which is to be welded to said workpiece protrudes from said chuck and the other end of said stud engages an inner portion of said chuck adjacent the bottom of said cavity.

4. Stud fastener apparatus comprising:
   a stud holder having a cavity in one end thereof adapted to support a fastening stud and to release said stud after it is secured to a workpiece,
   a stud feeder supported near said stud holder and adapted to supply a plurality of fastening studs from a remote location to a position adjacent said stud holder,
   means fo reciprocating said stud holder from a first position adjacent said workpiece to a second position remote from said workpiece into alignment with said stud feeder and then back to said first position, and
   means for moving said fastening studs by a positive loading device from said stud feeder into said cavity in said stud holder when said holder is in said second position by inserting only the base ends of said studs into said cavity so that said studs are engaged by said holder and subsequently moved to said first position for attachment to said workpiece.

5. Apparatus for loading stud welding apparatus comprising:
   a stud holder having a chuck adapted to suport a welding stud by frictional engagement therewith and to release said stud after it is welded to a workpiece,
   a stud feeder adapted to supply a plurality of properly oriented welding studs from a remote location to a position adjacent said stud holder,
   means for rotating said stud holder automatically from a first position adjacent said workpiece to a second position remote from said workpiece into alignment with said stud feeder and then back to said first position after a time delay, and
   means for moving said welding studs automatically by a powered loading device from said stud feeder into said holder through the front end of said chuck during said time delay when said holder is in said second position so that said studs are engaged by said chuck and may be subsequently moved to said first position for welding to said workpiece.

6. An automatic loading stud welding apparatus comprising:
   a stud holder having a chuck with a cavity therein adapted to support a welding stud and to release said stud after it is welded to a workpiece, a stud feeder including a block with a pair of passageways having a common outlet end adapted to supply a plurality of fastening studs from a remote location endways through one of said passageways to a position adjacent said stud holder, means for pivoting said stud holder automatically between a first position susbtantially perpendicular to said workpiece and a second position susbtantially parallel to said workpiece in which said chuck cavity is aligned with said outlet end of said feeder block, and means provided in said other passageway of said block for moving said welding studs automatically by a powered loading device from said feeder block endways into said chuck through the front of said cavity when said holder is in said second position so that said studs are held by said chuck and subsequently moved to said first position for welding to said workpiece.

7. A stud welder apparatus comprising:

a stud holder having a chuck adapted to hold a welding stud during attachment of said stud to a workpiece and to release said stud after said attachment, a support member pivotally attached to one end of said holder, means to pivot said stud holder on said support member from a first position substantially perpendicular to said workpiece to a second position substantially parallel to said workpiece for loading a welding stud into the free end of said holder through the front end of said chuck, and then back to said first position for welding of said stud to said workpiece, and means for providing relative movement between said workpiece and said chuck in a direction substantially perpendicular to said workpiece, separate from said means to pivot, when in said first position to weld said stud to said workpiece and to release said stud from said chuck after welding.

8. A stud welder apparatus comprising:

a stud holder having a chuck adapted to hold a welding stud during attachment of said stud to a workpiece and to release said stud after said attachment, and being shaped with a pair of movement stops thereon, a support member pivotally attached at one end thereof to one end of said holder and having a pair of surfaces on said one end of said member positioned to engage each of said stops on said holder in a different pivotal position, means to pivot said holder on said support member between a first position substantially perpendicular to said workpiece determined by one of said stops and a second position substantially parallel to said workpiece determined by the other of said stops for loading a stud into said holder through the front end of said chuck when in said second position and for welding of said stud to said workpiece when in said second position, and means for moving said chuck substantially perpendicular to said workpiece when in said first position, independent from said means to pivot, ot weld said stud to said workpiece and to release said stud from said chuck after welding to said workpiece.

9. A stud welder apparatus comprising:

a stud holder having a chuck with a cavity in one end thereof adapted to hold a welding stud during attachment of said stud to a workpiece and to release said stud after said attachment, a plunger shaft pivotally attached at one end thereof to one end of said holder to support said holder, a first fluid activated cylinder having a piston positioned to engage said holder and to pivot said holder on said support member from a first position adjacent said workpiece to a second position remote from said workpiece for loading a stud into said cavity and then to allow said holder to pivot back to said first position for welding of said stud to said workpiece, and a second fluid activated cylinder connected to the other end of said plunger shaft so that said plunger shaft forms the piston in said second cylinder for moving said stud holder substantially perpendicular to said workpiece when in said first position to weld said stud to said workpiece and to release said stud from said chuck after welding to said workpiece.

10. An automatically operating electrical stud welding machine comprising:

a stud holder including a chuck member shaped with a cavity therein to hold a welding stud by frictional engagement within said cavity during the operation of said machine and to release said stud after it is welded to a workpiece, a first pneumatic cylinder having a piston plunger therein pivotally attached at one end to said holder and positioned to move said chuck toward and away from said workpiece in a substantially straight line, a second pneumatic cylinder having a piston plunger therein positioned to engage said stud holder and pivot said holder about said plunger of said first cylinder between a first position adjacent said workpiece and a second position remote from said workpiece, a stud feeder device for loading stud fasteners to said holder including a loading block having a supply passageway and a loading passageway therein with a common outlet end supported adjacent said second position of said holder and a stud receiver chamber positioned at the junction of said passageways inside said loading block adjacent said outlet end for receiving welding studs from the supply passageway and for aligning said studs with said chuck cavity, and a third pneumatic actuating cylinder having a piston plunger therein supported adjacent said feeder device so that said stud may be moved from said receiver chamber into said chuck cavity by movement of said plunger of said third cylinder within said loading passageway when said chuck is in said second position.

References Cited in the file of this patent

UNITED STATES PATENTS

| | | |
|---|---|---|
| 2,078,694 | Smith | Apr. 27, 1937 |
| 2,195,962 | Hansen et al. | Apr. 2, 1940 |
| 2,537,989 | Graham | Jan. 16, 1951 |
| 3,014,120 | Adamson | Dec. 19, 1961 |